Aug. 15, 1933.   J. J. LERAY   1,922,167
HELICOPLANE AND AIRPLANE
Filed Feb. 20, 1933   3 Sheets-Sheet 1

Inventor:
Joseph J. Leray

Aug. 15, 1933.    J. J. LERAY    1,922,167
HELICOPLANE AND AIRPLANE
Filed Feb. 20, 1933    3 Sheets-Sheet 2

Inventor:
Joseph J. Leray

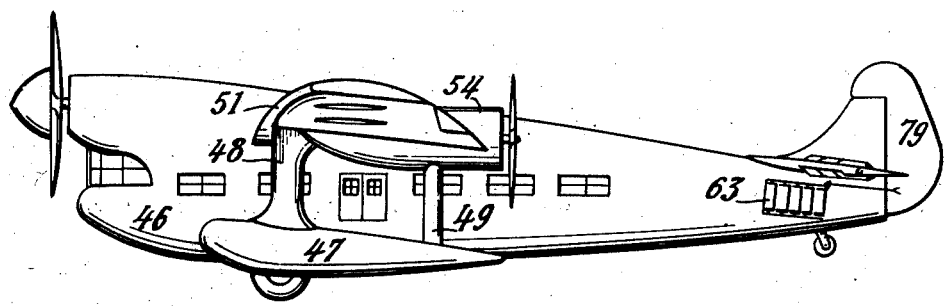
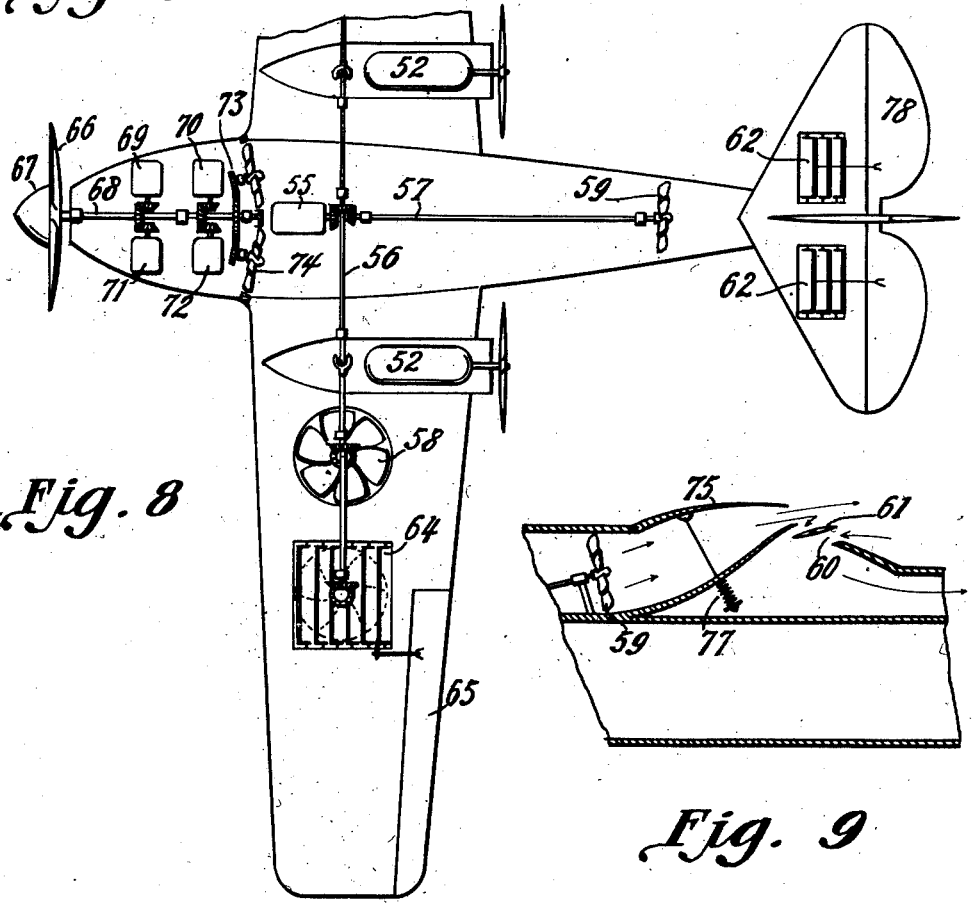

Patented Aug. 15, 1933

1,922,167

UNITED STATES PATENT OFFICE 1,922,167

HELICOPLANE AND AIRPLANE

Joseph J. Leray, West Warwick, R. I.

Application February 20, 1933. Serial No. 657,619

4 Claims. (Cl. 244—19)

The invention relates to improvements in helicoplanes and air planes: First,—by increasing the lift on the wing by suction, internally produced, distributed along the upper surface, with slots, to develop a vacuum; having the air released under the wing to obtain an increased pressure in retarding the relative wind and a direct upward lift from the ejection.

Second,—by maintaining and increasing the thrust of propellers at high speed, by applying the suction developed in the wing to retard the slipstream.

Third,—by improving the maneuverability in providing a positive control efficient at all speeds from the release of the air pumped in generating the suction.

Fourth,—by increasing the lift of airscrews by a double rotation.

Fifth,—by providing an automatic system adjusting, in flight, the pitch of the airscrews.

Sixth,—by increasing the efficiency of the power in harnessing the torque of the motors for the rotation of airscrews.

Seventh,—by perfecting the stability of direct-lift aircrafts in eliminating the torque from the body or fuselage and distributing uniformly the drag and the thrust, in airscrews, over the disc of rotation in flight.

The helicoplane is an aircraft of the helicopter and airplane type or more simply an airplane with an airscrew, explaining why this invention will find application in both the helicoplane and the airplane.

The helicoplane related to this invention has a wing very small compared to the airscrew. The airscrew itself being a combination of blades alternating with smaller airscrews having their own rotation while traveling around a common axis. The object of this combination being to increase the thrust of each individual airscrew by putting it in contact with a larger area of still air, thus encountering more resistance to decrease the velocity of the slipstream.

The small wing in the helicoplane has suction developed inside by several exhausting fans pumping the air out through the lower surface and sucking along the upper surface with slots to produce, with the cooperation of the relative wind, and indraught of the propellers an intense vacuum over the surface of said wing, the suction of the wing being also augmented by a fan installed at the rear end of the fuselage, communication being provided with the wing along the bottom of the fuselage. The exhaustion of the air providing a positive control by regulation with registers operated by the normal control.

The advance of the helicoplane is obtained by two pusher propellers individually driven by motors mounted on the wing, one on each side of the fuselage, said motors being enveloped by cowls in communication with the wing and ending closely adjacent to the propellers.

The suction on the wing is regulated with rolling slats manually operated, inserted in the slots, permitting to keep the slots open to maintain the suction on the wing and obtain vacuum and lift, or keep said slots closed forcing the suction through the cowls and around the propellors to increase the thrust, thus giving lift when landing and thrust when cruising.

The application of suction to the propellers draws back the air from the interior of the slipstream, which will develop a reaction against said slipstream from the air surrounding, the effect being to increase the slip of the propellers, resulting in a higher thrust. This improvement being very valuable for racing or high speed aircrafts, as at high speed it is difficult to maintain the efficiency of the propellers, said efficiency having a limit beyond which nearly all power added goes into waste.

The thrust being the product of the acceleration of a mass of air passing the propeller in a unit of time, the acceleration becomes more difficult as the speed of the aircraft increases, the slip on the back face of the propeller retreating gradually toward the tip, becoming about zero when the speed of the aircraft equals the speed of the slipstream, then the propeller having no thrust. If the speed of the aircraft continues to increase and exceeds the velocity of the slipstream, as in a dive, the slip passes on the face of the propeller, the thrust becoming negative, the propeller then acting as a brake.

From this explanation it is obvious that a negative slip and thrust start early on the face at the center of the propeller and keep creeping closely behind the retreating positive thrust, assuming a great importance past the maximum efficiency of the propeller, beyond which very little could be gained by additional power.

The thrust work is produced by the contact or slip of the propeller with the air, and said slip is entirely dependent for efficiency on definite requirements regarding dimensions, pitch and rotating speed of the propeller on one side, and on the other side on the conditions of the air in which the propeller is working. As the air contact changes rapidly with the speed of the aircraft, this invention has for object to restore favorable air conditions around the propeller at speed where said favorable conditions are normally gone. This restoration is accomplished by sucking the air from the rear of the propeller, the suction causing the surrounding air to follow the aircraft and the imparted speed given to said surrounding air making the effective speed of the air in contact with the propeller less than the speed of the aircraft, thus effecting means to maintain an efficient slip on the propeller at a higher speed.

The helicoplane being an airplane with an airscrew, it follows that all improvements in this invention not specially designed for airscrews are also applicable to airplanes. In airplanes this invention will improve the landing facility by adding lift to the wing at low speed as explained above, will improve the cruising speed by maintaining and increasing the thrust of propellers, and will provide positive control efficient at all speeds.

The invention is illustrated in the accompanying drawings in which Fig. 1 is a profile view of a helicoplane with a compound airscrew and pusher propellers.

Fig. 7 is a profile view of a multimotored amphibian airplane having means to increase lift, speed and control as provided in the helicoplane shown on Fig. 1.

Fig. 8 is a plan view of a diagram showing an arrangement of the invention applied to the airplane shown on Fig. 7.

Fig. 9 is a detailed view of a part of the fuselage at the junction of the wing showing the air release system for the motors compartment.

Figure 1:
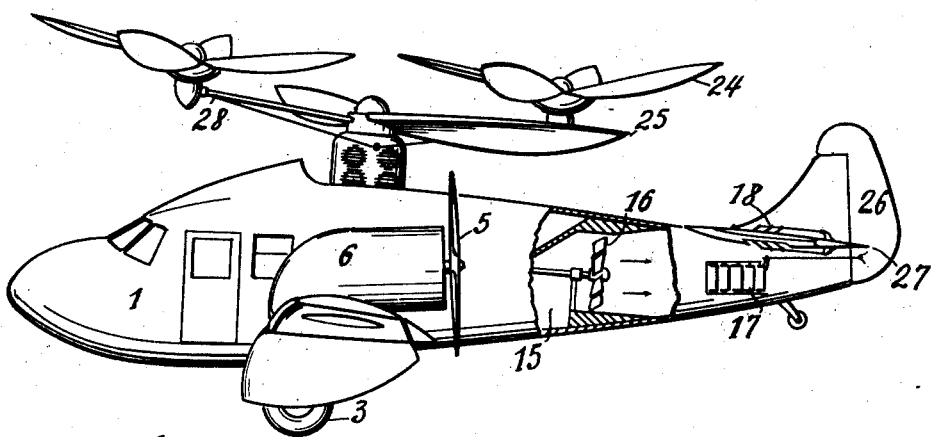
Figure 3:
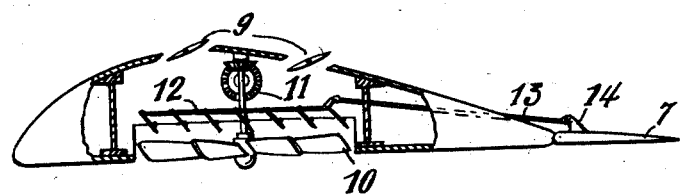
Fig. 3 is a cross section of the wing of the helicoplane near the tip, showing details of the slots and control.
Figure 2:
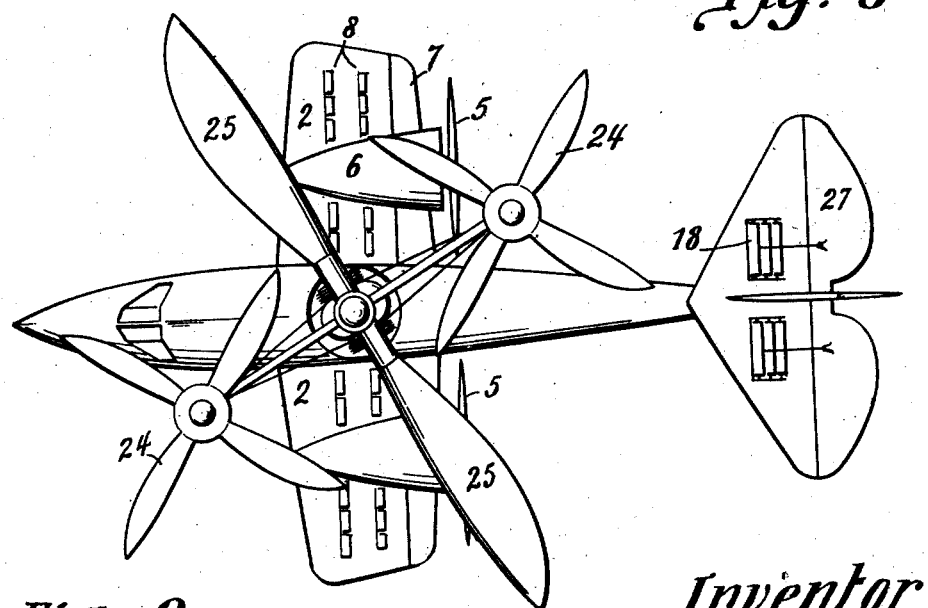
Fig. 2 is a view of the same helicoplane shown on Fig. 1.

The helicoplane shown on Figs. 1 and 2, has a body, 1, or fuselage of the type usually found in airplane, said body having fixed near the bottom, at about the center a short thick hollow wing, 2, Fig. 2, of strong structure resting on the landing gear, 3, Fig. 1, and supporting on the ground the whole aircraft; said wing carrying two motors, 4, one on each side of the fuselage, equipped with pusher propellers, 5; the motors being enveloped by large cowls, 6, streamlined with the wing and being in communication with it through their base, said cowls being at the rear closely adjacent to the propellers. The wing has ailerons, 7, hinged at its trailing edge and two rows of slots, 8, cut in the upper surface between the ribs, having rolling slats, 9, inserted in said slots, the slats being manually operated from the cockpit to close or open the slots. On the landing or take-off the slots are kept open to throw the suction on the wing, and in flight the slots are kept closed to force the suction through the cowling and around the propellers to increase the thrust.

Figure 5:
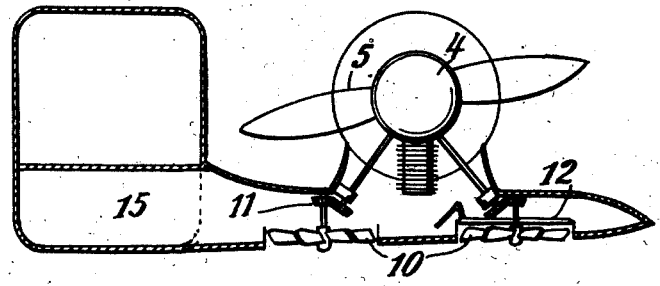
Fig. 5 is a section of the wing along the span, showing internal communication of the wing with the fuselage and cowl of motor.

The lower surface of the wing has four exhausting fans, 10, two on each side of the fuselage installed interiorly, with their blades coming about flush under said wing, the fans, 10, being driven respectively by their adjoining motors, 4, with suitable gears, 11, Fig. 5. The two fans placed at the wing tips being enclosed with a register, 12, connected with suitable rods and horns, 13 and 14, to the nearest aileron in such a manner that the raising of the aileron shuts the register, stopping the indraught and thrust of the fan, whereof a rolling moment is effected simultaneously from the aileron and the register tending to depress the wing.

The wing has interiorly communication with a passage, 15, along the bottom of the fuselage extending up to the tail, having at the rear end another exhausting fan, 16, Fig. 1, releasing the air through several registers at the tail, 17 and 18, being placed respectively two at the end of the fuselage and four on the horizontal fin, the fuselage's ones 17, being articulated with the rudder, 26, and those of the horizontal fin, 18, with the elevators, 27. The swinging motions of the rudder closing alternatively the register of the opposite side than the one it is turned on, and the elevators closing alternatively the lower or upper registers on the fin as the elevators are respectively moved up and down; the whole combination establishing a complete dual control, the air control being effective independently of the speed of advance.

Figure 4:
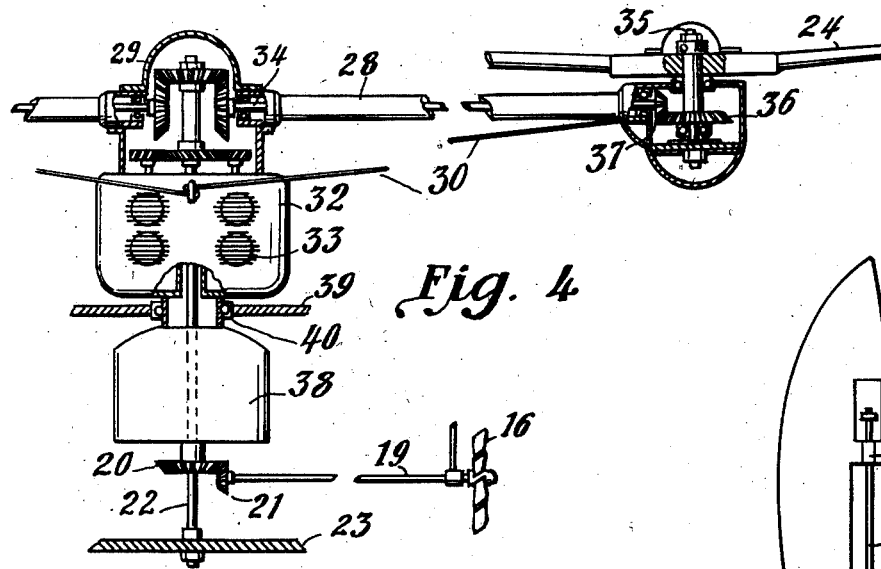
Fig. 4 is a detailed view of the installation and transmission of power in the airscrew of the helicoplane.

This helicoplane relies mostly on its airscrew for sustaining lift, said airscrew being mounted on a fixed shaft, 22, secured to the structure of the fuselage, 23, at the bottom. The airscrew is a compound one, being composed of two large blades, 25, and two small airscrews, 24, carried at the end of long arms, 28, which are fixed to a center hub, 29, alternating with the two blades, 25, well braced with streamlined wires, 30. The center hub is retained and carried at the upper end of a fixed vertical shaft, 22, on suitable ball or roller bearings; said hub having attached under it a box or housing, 32, Fig. 4, enclosing two small motors, 33, for the rotation of the two small airscrews, through a train of gears contained in said hub making connections with two shafts, 34, passing inside the arms, 28, the rotation passing then from the shafts to the airscrews through suitable gearing; said small airscrews being mounted with ball or roller bearings on a spindle, 35, fixed at the end of the supporting arms, 28, the whole power being expended to rotate the airscrews, 24, and the gearing being in such arrangement that the reaction or torque of the motors will spin the whole combination around the vertical shaft, 22, in a direction opposite to that of the small airscrews, 24. The motors, accessories and tanks, 38, being attached to the housing, 32, under it, making the whole aggregation: small airscrews, motors, tanks and accessories, a solid body turning freely around the vertical shaft on ball or roller bearings. This combination being held by the fuselage, between the motors and the tanks, by roller bearings, 40, attached at the top of the fuselage, 39. A driving gear, 20, attached to said combination below the tanks transmits through a gear, 21, and shaft, 19, the motive power to rotate the exhaust fan, 16, at the rear.

Means for control of fuel and ignition are provided by rods passing inside the vertical shaft operated from the bottom, moving up and down two discs connected to said rods through slots in the shaft; said discs sliding along the shaft between the motors, said motors having roller levers attached to the throttle bearing on one disc and other similar levers for the ignition bearing on the other disc. Said discs being pulled down by the rods and returning up with springs. None are represented.

Figure 6:
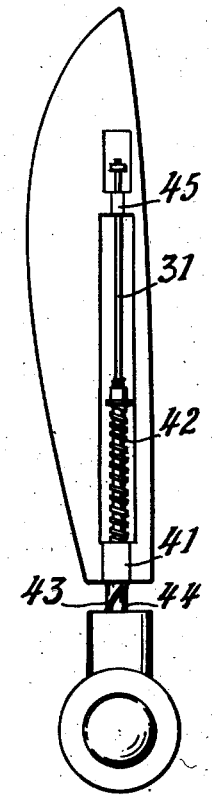
Fig. 6 is a sectional view of the blade, showing the mechanism of the feathering system.

The blades of the airscrews are all of a uniform feathering type and movable on their carrying axles, 31, Fig. 6; the axles being fixed to their respective hubs, having attached at their root a shank, 44, with elongated treads, 43, on which slides a fitting grooved sleeve, 41, secured to the blade, forcing said blade to turn around its axis when moving out along the axle under the centrifugal force developed by the rotation, having said centrifugal force opposed by the compression of a spring, 42, wound and retained around the axle bearing against the grooved sleeve, 41, opposed also by the pressure of the relative wind as the axis of the blade is fixed well ahead of the center, the blade choosing invariably an attitude putting the different opposing forces in equilibrium. The tip bearing of the blade being free to turn and slide on the axle. At rest, the compression spring is adjusted to keep the blade against the hub with the trailing edge in a raised position suitable for vertical descent or gliding.

The small airscrews, 24, while rotating on themselves, develop around the central axis a spinning moment resulting from the reaction of the drag developed by their blades; said reaction acting at their two points of attachment: on the spindle, 35, at the center of the small airscrews and on the central vertical shaft, 22, at the center of the combination. If the center of the drag developed on the blade of the small airscrews is assumed to be localized at a particular distance from the center on the blade, said distance will represent the arm-moment of the blade; when said arm-moment remains equal and balanced relatively to the individual center of rotation on the spindle, it changes continually regarding the common center or central axis, the arm-moment of the blade being farther distant of the central axis when passing out than when passing in, the difference developing a turning-moment imparted to the arm, 28, carrying the small airscrews, in a direction opposite to the direction of the blade when passing out. The rotation obtained for the combination in this manner does not require any additional power for the airscrews, the effect of the double rotation on the individual airscrew being to reduce the effective speed of the blade passing out, while accelerating the effective speed of the blade passing in, causing the distribution of the drag over the central disc of rotation to be improved, and more thrust and lift being possible at a reduced drag, as the efficiency of the compound airscrew is maintained all over the area of the disc of rotation, making an advanced improvement compared to the common airscrew where the drag and thrust are mostly confined toward the tip of the blades, having effective only an annular portion of the disc area.

The autorotation from the drag of the blades and torque of the motors furnishes a powerful mean of rotation for the compound airscrew, at no additional power, and perfect isolation from the body or fuselage, having only the friction of the bearings, resulting in a near perfect stability and easy maneuverability. The rotation of the fan at the tail with the airscrew produces a small spinning moment, but offers at the same time a far greater mean to care for it.

The helicoplane equipped with such a compound airscrew will have aerodynamically the most efficient lifting ability possible as fluid momentum producer, the totality of the disc being under the efficient action of the blades; improving also the stress imposed on the structure by reducing the bending moment.

The omission of the airscrew in an helicoplane will leave the aircraft an airplane, and as such all characteristics of the invention not specially designed for the airscrews will find application to the airplane. For this purpose a large amphibian airplane with several motors has been illustrated on Fig. 7. Said amphibian being designed for fast transportation while retaining a slow landing speed and having positive air control improving the maneuverability on land or water. This amphibian airplane is divided in two floors, the lower or first floor providing passengers or freight accommodations, while the upper or second floor is reserved exclusively for the power plants, supplies and most of the equipments necessary to apply the present invention. Toward the bottom of the fuselage or hull, 46, Fig. 7, are solidly attached on each side a pair of strong beams or short spars having cross ribs and covering fastened to them forming a flat float or a platform to emerge on from the cabin, the regular float and landing gear combination, 47 and 50 being fixed strongly at the end of the beams, being of sufficient strength to support the whole aircraft on landing. Said landing gear and float combination being strongly braced to the wing with struts, 48 and 49; the front one, 48, containing the shock-absorbing system for the wheels, 50.

Figure 10:
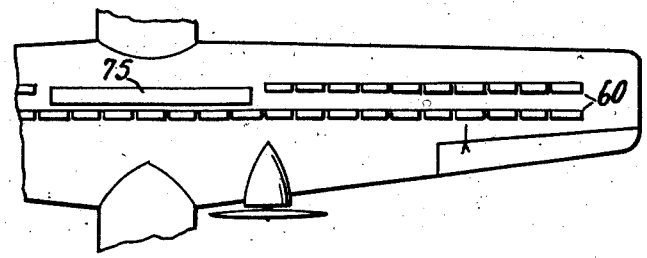
Fig. 10 is a plan view showing the location of the slots in the airplane along the upper surface of the wing.

The wing, 51, is attached to the top of the fuselage, the thickness at the root being nearly equal to the depth of the upper compartment in the fuselage, said fuselage and wing being interiorly in communication. The wing carries two large motors, 52, Fig. 8, equipped with pusher propellers, 53, one on each side of the fuselage, said motors, 52, being enveloped with cowls, 54, streamlined with the wing and in communication with it, open at the rear end with the edge of said cowls closely adjacent to the propellers. At about the center of the wing another motor, 55, is substantially mounted for the rotation, through suitable gears and shafts, 56 and 57, of several exhaust fans, of which four, 58, are installed inside the wing flush with the lower surface, and one, 59, located at the rear end of the fuselage; all said five fans pumping the air from the interior of the wing; the suction being carried on the upper surface of said wing through slots, 60, Fig. 10. The volume of air pumped being regulated with rolling slats, 61, inserted in the slots and pivoted on the ribs manually operated. The pumped air is directly released downwardly under the wing, while it is released through registers, 62 and 63, at the tail; said registers, 62, on the horizontal fin being operated by the elevators, 78, and registers, 63, on the fuselage operated by the rudder, 79, effecting a positive control as explained above for the helicoplane. The outward fans on wing being enveloped by registers, 64, operated by the adjoining ailerons, 65, where from the raising of the ailerons the registers become shut and their thrust under the wing being stopped, effecting simultaneously with the ailerons a depressing moment for the wing. On landing and take-off the slots on the wing are kept open to maintain the suction and develop vacuum on the wing to obtain the maximum lift, while on cruising speed the slots are kept closed to divert the suction to the propellers to obtain the maximum thrust from the pusher propellers.

This amphibian has a giant nose propeller, 66, with a large spinner, 67, attached to its face. Said giant propeller is bolted at the end of a shaft, 68, coming out at the nose through a circular opening a little less in area than the base of the spinner. This giant propeller being rotated by four motors, 69, 70, 71 and 72, geared to its shaft, the motors being installed and enclosed in the forward part on the fuselage on the upper floor. Behind these four motors two exhaust fans 74, are installed suitably geared, 73, to the rear end of the shaft, 68, to maintain a strong air current entering the motors compartment at the nose and exhausting on the upper surface of the wing by raising a hinged panel, 75, built for the purpose. The panel resting down on the ribs, with the cessation of the air current, under its own weight and a down pull received from rods, 76, pinned under the panel, having springs, 77, compressed against the opposite wall of the passage and being retained at the free ends of the rods by nuts and washers. The air released under the panel passes over the second row of slots on the wing cooperating there with the suction to develop a vacuum on the wing, resulting in added lift. While the air current passing the motor compartment provides an ideal cooling system for the motors, the suction at the nose affects the condition of the air coming into contact with the propeller. As the air coming at the center of the propeller is deflected outwardly by the spinner, 67, and immediately received and thrusted by the propeller, no air can possibly enter the nose opening directly from the front; the suction will act from the side and rear of the propeller in the center of the slipstream causing said slipstream to contract and slow down its velocity under the reaction of the surrounding atmospheric pressure influenced by the suction at the nose; the result on the propeller being a large slip accompanied with a higher thrust. The invention as a whole improving the landing facility, the cruising speed and the maneuverability of this amphibian airplane.

From the above description of the invention, I claim:

1. In helicoplanes and airplanes, a wing formed with a series of slots cut in the upper surface thereof, rolling slats, fans installed inside the wing flush with the lower surface thereof and discharging downwardly under the wing and developing an internal suction within the wing, motors substantially mounted on the same wing for driving said fans thru suitable gears and shafts, pusher propellers driven by said motors, relatively large cowls enveloping the motors and communicating interiorly with the wing thru their base and ending past the trailing edge with a circular opening closely adjacent to said pusher propellers driven by the motors enclosed in said cowls, the shutting of the slots shifting the suction from the wing to the propellers environment thru the cowls, said suction increasing the slip of the propellers by retarding and contracting the slipstream behind the propellers, thus effecting a higher thrust or maintaining the same thrust at a higher speed, and the opening of the slots shifting the suction onto the wing to cooperate with the relative wind and indraught of the propellers to develop a vacuum thereon resulting in an increased lift from said wing; also an exhaust fan installed in the rear part of the fuselage, having communication with the wing thru a passage provided along the bottom of said fuselage, the air thrusted by said rear fan being discharged sternwardly at the tail thru registers.

2. In helicoplanes and airplanes, a wing formed with series of slots cut in the upper surface thereof, rolling slats, fans installed inside the wing flush with the lower surface thereof and discharging downwardly under the wing and developing an internal suction within the wing, motors substantially mounted on the same wing for driving said fans thru suitable gears and shafts, pusher propellers driven by said motors, relatively large cowls enveloping the motors and communicating interiorly with the wing thru their base and ending past the trailing edge closely adjacent to said pusher propellers; a fan installed in the rear part of the fuselage communicating with the wing by a passage along the bottom of said fuselage; air registers enveloping the fans installed inside of said wing to regulate or stop the indraught of said fans whereof the thrust of said fans will be decreased or eliminated; articulated rods connecting said registers to the ailerons causing said registers to shut when the ailerons are raised, whereof a dual lateral control is effected; other registers set at the tail to regulate the flow of air released by said mentioned fan in the rear of the fuselage to obtain positive longitudinal and directional control, two of said registers being set at the end of the fuselage, one on each side, with operating rods connected to the rudder which pull the register shut on the opposite side on which said rudder is turned on; four of said registers being set on the horizontal fin, two on the upper surface and two on the lower one, said four registers being connected with operating rods to the elevators which pull the upper registers shut when the elevators are turned down and reversely shut the lower registers when turned up; the complete positive air control effected for the aircraft by the regulation of said air currents thru registers connected respectively to the ailerons, elevators and rudder, without impairing the normal control.

3. In multi-motored airplanes, a wing formed with series of slots cut in the upper surface thereof, rolling slats, fans installed inside the wing flush with the lower surface thereof discharging downwardly under the wing, motors substantially mounted on the same wing, pusher propellers driven by said motors on the wing, relatively large cowls communicating interiorly with said wing and enveloping said motors and ending past the trailing edge closely adjacent to said pusher propellers, a fan installed in the rear of the fuselage drawing the air from the wing thru a passage along said fuselage, said fan discharging the air sternwardly at the tail, registers controlling said discharged air at the tail, two of said registers articulated with the rudder by rods being set at the end of the fuselage one on each side, four of said registers, articulated by rods with the elevators, being set above and under the horizontal fin; other registers enveloping the outer fans inside the wing and respectively connected and operated by their adjoining aileron by articulated rods; a motor substantially mounted inside the fuselage with suitable gears and shafts for the rotation of all said above mentioned fans; four motors substantially mounted inside the forward upper part of the fuselage; a common shaft on suitable bearings geared to said four motors driving a giant propeller at the nose; two fans installed behind said four motors inside the fuselage driven by said common shaft thru suitable gears, said two fans drawing the air from the nose and developing a vacuum thereon behind the center of the propeller, while establishing a strong current passing the motor compartment for cooling purpose; a giant nose propeller, a large spinner attached to said nose propeller deflecting the incoming air to the effective part of the blades and compelling the suction done behind said spinner to act from the rear of said nose propeller to increase the thrust by retarding and contracting the slipstream of said propeller; a hinged panel at the center of the wing opening the motor compartment at the rear to discharge sternwardly over the wing the inside current passing the motor compartment, the compression of said current raising said panel, said current passing over slots cut in the upper surface of the wing for the production of vacuum; pulling rods with compression springs wound around them pinned to said raising panel to stiffen its opening and keep it closed at rest.

4. In helicoplanes, a wing with series of slots cut in the upper surface thereof, rolling slats, fans installed inside the wing discharging under downwardly and developing internal suction within said wing, motors mounted on the same wing driving said fans, pusher propellers driven by said motors, relatively large cowls in communication with said wing enveloping said motors and ending closely adjacent to said pusher propellers, a fan installed in the rear of the fuselage exhausting the air from the wing thru a passage along said fuselage and discharging sternwardly at the tail, registers enveloping said fans inside of the wing to regulate or stop the indraught of said fans, operating rods connected to said registers inside the wing to adjoining ailerons, registers set at the end of the fuselage operated by rods connected to the rudder, registers set on the horizontal fin operated by rods connected to the elevators, the air thrusted from the fan installed in the rear of the fuselage being released out thru said registers connected respectively to the rudder and elevators for control purposes; a compound airscrew mounted at the upper end of a vertical shaft secured to the bottom of the fuselage, said compound airscrew having successively attached to it, under the hub, a box or housing carrying two small motors and their accessories, the tanks and a driving gear positioned underneath the same, the whole forming a combination fastened together turning freely around the vertical shaft as a solid body on suitable ball or roller bearings, other parts and their combined arrangement forming said compound airscrew as follows: the hub of said airscrew having attached to its side radially two long axles carrying respectively two large feathering blades movable on them and two long arms well braced with streamlined wires alternating on the hub with the axles, said long arms carrying each at their end a smaller airscrew having four feathering blades movable around axles attached together radially to a hub rotating on a spindle fixed at the end of said long arms on suitable ball bearings, said smaller airscrews being driven by the power of said two motors contained in the housing attached to the central hub, the power passing successively from the motors to the gears contained in the central hub, thence to the shafts enclosed inside said long arms and from said shafts to the gears attached to the hub of said smaller airscrews, the whole power being expended for the rotation of said smaller airscrews, the gearing system being in such manner to apply the reaction or torque of the motors mounted on said compound airscrew to turn the whole combination on the stationary vertical shaft in a direction opposite to the rotation of the smaller airscrews, the combination having, in addition to the torque, another turning moment around the central axis generated from the reaction of the drag developed along the blades in said smaller airscrews by their rotation, said combined moment effecting an efficient mean to rotate the compound airscrew at no expense of power and no torque effect induced to the body of the aircraft, said combination furnishing means for uniform distribution of the drag and thrust, in flight, around the disc of rotation in the compound airscrew, from the individual rotation of said smaller airscrews while traveling around the central axis, said uniform distribution increasing the individual thrust of said smaller airscrews as their slipstream becomes retarded by meeting a larger area of still air, all blades forming said compound airscrew being of a uniform feathering type having at their root for bearings a grooved sleeve fitting a beaded shank fixed on their axles forcing the blades to turn on said axles lowering their trailing edge when sliding out under the centrifugal force developed by their rotation and having a combined restoring moment from the relative wind meeting the blades as their axes are fixed well ahead of their center, and from compression springs wound around their axles pressing the blades toward their hubs, said blades turning and sliding freely at their tip bearings, all said blades having from the combination an automatic adjustment for their pitch, a driving gear attached to the compound airscrew under the tanks transmitting with suitable gears and shafts the motive power for the rotation of a fan installed in the rear of the fuselage, assuring positive longitudinal and directional control to the helicoplane when the airscrew alone is kept on power for landing, means to hold said compound airscrew to the structure of the fuselage at the top on roller bearings between the housing of the motor and the tanks, suitable sliding discs installed along the vertical shaft said discs bearing against roller arms attached to the throttle levers and magneto switches for control of fuel and ignition for the rotating motors of the compound airscrew, rods attached to and pulling down said discs and operated from the bottom and passing inside the vertical shaft, and springs returning said discs up to their original position.

JOSEPH J. LERAY.